United States Patent [19]

Boyden

[11] Patent Number: 4,528,574

[45] Date of Patent: Jul. 9, 1985

[54] APPARATUS FOR REDUCING EROSION DUE TO CAVITATION IN INK JET PRINTERS

[75] Inventor: James H. Boyden, Los Altos Hills, Calif.

[73] Assignee: Hewlett-Packard Company, Palo Alto, Calif.

[21] Appl. No.: 479,785

[22] Filed: Mar. 28, 1983

[51] Int. Cl.³ .......................... G01D 15/16; B41J 3/04

[52] U.S. Cl. ................................ 346/140 R; 400/126

[58] Field of Search .......................... 346/140 PD, 75; 400/126

[56] References Cited

U.S. PATENT DOCUMENTS

| | | | |
|---|---|---|---|
| 2,512,743 | 6/1950 | Hansell | 346/140 PD |
| 3,747,120 | 7/1973 | Stemme | 346/140 PD |
| 4,368,476 | 1/1983 | Uehara | 346/140 PD |
| 4,370,668 | 1/1983 | Hara | 346/140 PD |
| 4,410,899 | 10/1983 | Haruta | 346/140 PD |
| 4,435,717 | 3/1984 | Eida | 346/140 PD |

OTHER PUBLICATIONS

Hawley, *Condensed Chemical Dictionary*, 1977, 9th Ed., pp. 774–775.

*Primary Examiner*—Thomas H. Tarcza
*Assistant Examiner*—M. Reinhart
*Attorney, Agent, or Firm*—Jeffery B. Fromm

[57] ABSTRACT

A novel structure which reduces stress due to cavitation in a thermal ink jet head is disclosed. A jetting resistor is formed on a thin membrane and suspended in contact with an acoustic absorber such as silicon oil on its back surface. The pressure wave created by the collapsing bubble which occurs in the ink on the membranes front surface each time the resistor is fired is thus absorbed by the silicon oil. The failure rate of such a jetting resistor is thus substantially reduced.

14 Claims, 2 Drawing Figures

APPARATUS FOR REDUCING EROSION DUE TO CAVITATION IN INK JET PRINTERS

BACKGROUND

One of the most pervasive failure mechanisms in an ink jet printer head is the gradual erosion and eventual failure of the jet producing member (e.g., a resistor in a thermal ink jet printer), its protective overcoat and the underlying substrate by the action of the repetitive high speed collapse of the vapor bubble created during jetting. Some substantial improvements in life of these devices have been achieved via choice of geometry, materials and the fluid over the resistor.

However, the life as limited by cavitation damage is still a problem, especially for large arrays of jets which are more expensive to manufacture and are statistically more prone to failure.

SUMMARY OF THE INVENTION

The present invention is a structural solution to the problem of cavitation damage. It utilizes the fact that the bubble collapse pressure wave can be absorbed over a considerably greater length if the materials are carefully chosen to create a nominal acoustic impedance match, but with an appropriate resistive dissipative component, to gradually absorb the pressure wave in the underlying structure.

The jet resistor is fabricated on a membrane which is chosen to be acoustically transparent at the highest frequency of occurance of the cavitation pressure pulse. The membrane is supported on a substrate which forms a wall of the ink reservoir and the jet resistor is positioned on a cavity in the substrate containing an acoustically absorpant material. The jet resistor is then fired to create the desired ink jet by means of a vapor bubble. As the vapor bubble collapses, an acoustic wave is produced which is harmlessly dissipated by the acoustically absorbant material without damage to the jet printer head.

DETAILED DESCRIPTION OF THE INVENTION

Figure 1:
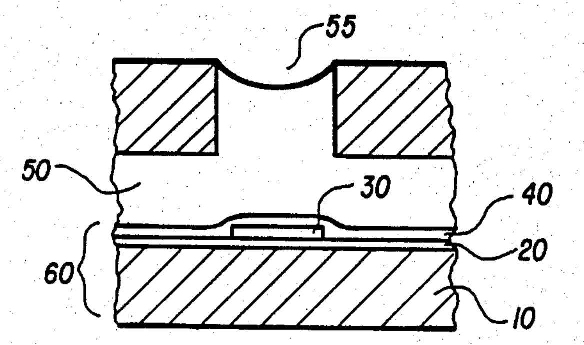
FIG. 1 (PRIOR ART)
FIG. 1 shows a conventional ink jet device according to the prior art.

FIG. 1 shows a typical structure of a conventional thermal ink jet device. The substrate 10, thermal isolation layer 20, resistor 30, and protective passivation layer 40 are well acoustically "hard" and differ substantially in acoustic impedance from that of the working fluid 50 (e.g., ink). Therefore, the pressure wave created by bubble collapse created by the firing resistor 30 to jet the ink 50 out of an orifice 55 reflects strongly from the structure. This creates a high level of compressive stress on the structure 60, eventually causing erosion of the materials of the structure 60.

Figure 2:
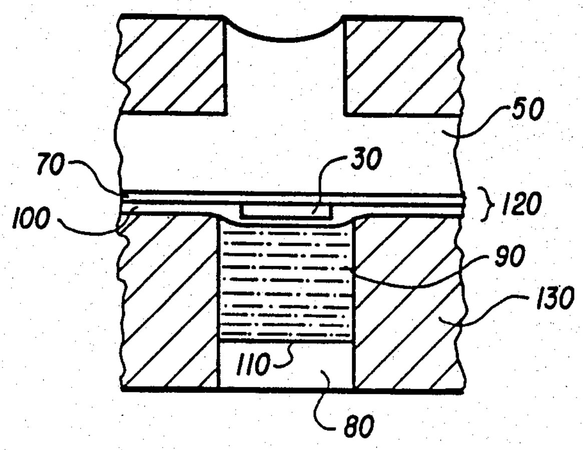
FIG. 2 shows an ink jet device according to the preferred embodiment of the present invention.

In the present invention as shown in FIG. 2, the resistor 30 is deposited on a free standing thin membrane 70. The membrane material is chosen to be strong and inert for corrosion resistance (e.g., silicon carbide) on the order of one micrometer in thickness. The resistor 30 is also thin typically 0.2–0.5 micrometer.

In a cavity 80 behind the membrane 70 and in contact with both the membrane 70 and the resistor 30, is a material 90 which serves as an acoustic absorber and has the following properties:

1. Acoustic impedance (real component of impedance) approximately equal to that of the working fluid 50 (ink).
2. Boiling and/or decomposition point above the highest temperature attained by the resistor 30.
3. Thermal conductivity selected to ensure that most of the heat energy created by the resistor 30 goes into the working fluid 50 rather than into the acoustic absorber 90, but the relaxation time is consistent with the maximum jet firing repetition rate desired. It may sometimes be necessary to insert a thermal isolation layer 100 (e.g., a silicon dioxide film about 2 micrometers thick) between the resistor 30 and the absorber 90 in order to obtain proper thermal response and efficiency.
4. Acoustic absorption (imaginary component of impedance) chosen to absorb an acoustic wave substantially before it reflects from the terminus 110 of the absorber 90.
5. Physical properties chosen to maintain good physical contact with the membrane structure 120.

The membrane 70, resistor 30 and thermal barrier 100 (if used) are acoustically thin at the frequencies which are characteristic of the pressure wave, typically 100 kHz to 10 MHz. "Thin" means that the acoustic thickness is considerably less than the wavelengths of the pressure wave. Therefore, the structure 120 is substantially acoustically "invisible" since the absorption is also relatively small. The absorber material 90 matches reasonably well in impedance that of the working fluid 50, resulting in a wave which enters the cavity 80 and dissipates over a relatively long distance, thus greatly reducing the stress created by the collapsing bubble.

Examples of acceptable absorbers 90 are a silicone oil such as DC-200 available from Dow-Corning, Inc. of Midland, Michigan or a high temperature silicone elastomer such as RTV 3145 also available from Dow-Corning, Inc. If the absorption length is too long in a given fluid or elastomer, it can be loaded with a suspension of fine particles such as a metal powder to make the absorber 90 acoustically more dissipative.

A fabrication technique which lends itself to realizing the structure 120 is described by Lloyd in U.S. Patent application *Inverse Processed Resistance Heater,* Ser. No. 444,412 filed Nov. 24, 1982, wherein the structure 120 is fabricated in reverse order as compared to conventional film resistors and then etching away an underlying substrate (not shown). The result is an inverse fabricated resistor 30. A passivation film 70 such as 1–2 microns of silicon dioxide or silicon carbide is deposited directly on a first substrate (not shown) such as silicon or glass to form a flat, smooth passivation wear layer. This is followed by deposition and subsequent patterning of resistance 30 and conductive layers (not shown), for example made of 500 angstroms of tantalum/aluminum and 1 micron of aluminum respectively. A thermal isolation layer 100 such as 2–3 microns of silicon dioxide is then deposited over the resistor 30 and conductor (not shown) pattern, followed by a thick layer 130 (10–1000 microns) of a metal such as nickel or copper, which serves as a final supporting substrate 130.

By etching holes in the supporting substrate 130 or forming holes during the forming process, the cavity 80 is formed for the absorber 90. Thus, the resistor 30 is suspended by means of the membrane 70 over the cavity 80 and the force of the collapsing bubble in the working fluid 50 is transmitted and safely absorbed by the absorber 90.

As an example, consider the membrane 70 composed of 2–3 microns of silicon carbide. Calculation of the longitudinal acoustic velocity, C, using the values of physical material properties yields a value of approximately $$C=12{,}000 \text{ meters/sec.}$$

The frequencies of concern in a thermal ink jet device are considerably less than $$f<50 \text{ MHz}$$

Therefore, the wavelengths L in silicon carbide are longer than $$L>12{,}000 \text{ m/sec}/50 \text{ MHz}=250 \text{ micrometers}$$

Since the membrane 70 is about 1–2 micrometers thick, the wavelength L is easily much greater than the membrane thickness, thus satisfying the first "invisibility" criterion. The acoustic dissipation is also very low over this thickness and frequency range, satisfying the second criterion.

Other materials in the structure 120 i.e., the resistor 30 and the thermal control layer 100 can be shown to satisfy these same criteria.

Further, if the acoustic impedance of the ink 50 (typically a water based solution), is examined and compared with that of some high temperature oils that can be used as an absorber medium 90, it is possible to obtain quite a good impedance match, sufficient to reduce the acoustic reflection by factors of 3 to 10 or more compared with conventional solid structures as shown in FIG. 1.

Such a reduction in acoustic reflection will also produce a reduction in cavitation impact stress by 3 to 10 or more, and increase the lifetime of the structure 120 by many orders of magnitude because it is believed that the failure of the structure 120 is a fatigue phenomenon. Fatigue failure life is typically a very strong function of stress for a given material. In some cases even a factor of two reduction in stress can yield several orders of magnitude increase in the number of stress cycles before failure.

Experimental results have shown a substantial reduction in failure rates. A silicon carbide membrane 70 supported on a silicon wafer 130 was fabricated with a resistor 30 made from Ta-W-Ni amorphous metal. The silicon wafer 130 had a cavity 80 opened behind the resistor 30 and the cavity 80 contained silicone oil as an absorber 90. Repetitive pulsing of the resistor 30 with water as the working fluid 50 produced high speed bubble generation and collapse, as in a conventional thermal ink jet.

Approximately 90 million bubbles were generated before some signs of failure due to corrosion, not cavitation damage, was observed. The same conditions with a solid, i.e., non-acoustically backed, substrate as in FIG. 1 have yielded only on the order of 1 million pulses before cavitation induced failure. Thus, the present invention has been shown to reduce the resistor 30 failure rate by a least a factor of 90.

I claim:

1. An apparatus for jetting a fluid from a reservoir through an orifice, comprising:

a substrate forming at least a portion of a wall of the reservoir;

a cavity in the substrate, said cavity having a terminus within the substrate;

a membrane covering the cavity;

jetting means coupled to the membrane and positioned in proximity with the cavity for producing an expansion force in the fluid; and absorber means in the cavity and coupled to the membrane for gradually absorbing a contracting force produced in response to the expanding force to prevent damage by the contracting force to the jetting means, said absorber means having a real component of acoustic impedance substantially the same as the real component of acoustic impedance of the fluid in the reservoir and an absorptive component of acoustic impedance different from the absorptive component of acoustic impedance of the fluid in the reservoir to substantially absorb the contracting force before said contracting force reflects from the terminus.

2. An apparatus as in claim 1 wherein the membrane comprises silicon carbide.

3. An apparatus as in claim 1 wherein the jetting means is a resistor.

4. An apparatus as in claim 3 wherein the expansion force is produced by a bubble produced by heating the resistor with an electrical current.

5. An apparatus as in claim 4 wherein the contracting force is produced by the collapse of the bubble.

6. An apparatus as in claim 1 wherein the absorber means comprises silicone oil.

7. An apparatus as in claim 1 wherein the absorber means comprises a silicone elastomer.

8. An apparatus as in claim 1 wherein the absorber means further comprises a suspension of solid particles.

9. An apparatus for preventing cavitation damage by bubbles produced in a fluid in a reservoir, comprising:

a substrate forming at least a portion of a wall of the reservoir;

a cavity in the substrate, said cavity having a terminus within the substrate;

a membrane covering the cavity;

bubble means coupled to the membrane and positioned in proximity with the cavity for producing the bubbles in the fluid; and absorber means in the cavity and coupled to the membrane for gradually absorbing a force produced by collapse of the bubbles in the fluid to prevent damage to the bubble means by the force produced by the collapse of the bubbles, said absorber means having a real component of acoustic impedance substantially the same as the real component of acoustic impedance of the fluid in the reservoir and an absorptive component of acoustic impedance different from the absorptive component of acoustic impedance of the fluid in the reservoir to substantially absorb the force produced by collapse of the bubbles in the fluid before said force produced by collapse of the bubbles in the fluid reflects from the terminus.

10. An apparatus as in claim 9 wherein the membrane comprises silicon carbide.

11. An apparatus as in claim 9 wherein the bubble means is a resistor and the bubbles are produced by heating the resistor with an electrical current.

12. An apparatus as in claim 9 wherein the absorber means comprises silicone oil.

13. An apparatus as in claim 9 wherein the absorber means comprises a silicone elastomer.

14. An apparatus as in claim 9 wherein the absorber means further comprises a suspension of solid particles.

* * * * *

UNITED STATES PATENT AND TRADEMARK OFFICE
CERTIFICATE OF CORRECTION

PATENT NO. : 4,528,574

DATED : July 9, 1985

INVENTOR(S) : James H. Boyden

It is certified that error appears in the above—identified patent and that said Letters Patent is hereby corrected as shown below:

Column 1, line 53 delete "well" and insert "all--

Signed and Sealed this

*Twenty-ninth* Day of *October 1985*

[SEAL]

*Attest:*

DONALD J. QUIGG

*Attesting Officer*

*Commissioner of Patents and Trademarks—Designate*